United States Patent [19]
Malvestuto, Jr.

[11] 3,856,238
[45] Dec. 24, 1974

[54] AIRCRAFT TRANSPORTER

[76] Inventor: Frank S. Malvestuto, Jr., 4295 E. Mexico Ave., Denver, Colo. 80222

[22] Filed: Apr. 14, 1972

[21] Appl. No.: 244,068

[52] U.S. Cl............................ 244/5, 244/6, 244/25, 244/26, 244/55
[51] Int. Cl........................... B64b 1/20, B64b 1/34
[58] Field of Search............ 244/5, 2, 6, 12 R, 12 B, 244/54, 55, 13, 17.23, 17.27, 25, 26, 29, 244/119, 30; 71/1 F

[56] References Cited
UNITED STATES PATENTS

| | | | |
|---|---|---|---|
| 889,693 | 6/1908 | Lake..................................... | 244/30 |
| 1,307,826 | 6/1919 | Matthews et al. ..................... | 244/6 |
| 1,414,186 | 2/1922 | Holson................................... | 244/6 |
| 1,764,336 | 6/1930 | Narusch............................. | 244/12 R |
| 1,808,132 | 6/1931 | Duering................................ | 244/30 |
| 1,897,756 | 2/1933 | Hahn..................................... | 244/5 |
| 2,194,596 | 3/1940 | Henter.............................. | 244/55 X |
| 3,159,361 | 12/1964 | Weiland............................ | 244/12 R |
| 3,372,891 | 3/1968 | Malvestuto....................... | 244/12 R |
| 3,559,920 | 2/1971 | Moore................................... | 244/5 |

FOREIGN PATENTS OR APPLICATIONS

| | | | |
|---|---|---|---|
| 137,377 | 3/1930 | Switzerland.......................... | 244/13 |

*Primary Examiner*—Trygve M. Blix
*Assistant Examiner*—Barry L. Kelmachter

[57] ABSTRACT

An aircraft comprises a plurality of wings. Each of the wings has a leading edge and a trailing edge and upper and lower surfaces defining an airfoil portion which produces a lifting force when the wing is moved through the air. At least a portion of the trailing edge of each wing is configured to define a semicircle. A power-driven rotor is mounted for rotation in the semicircle and has generally radial blades extending into close proximity with the semicircular surface portion of the trailing edge of the wing and arranged to produce a downward air flow at the trailing edge. The radial blades rotate in a plane that intersects the semicircular portion of the wing trailing edge, and increase the velocity of air flow across the upper surface of the airfoil portion and decrease the velocity of air flow across the lower surface of the airfoil portion thereby increasing the lifting capability of the airfoil. The tips of the rotor blades are located so that when they are in proximity to the trailing edge of the wing, the upper portion of each tip is below the upper edge of the semicircular portion of the wing trailing edge and above the lower edge thereof. The axis of rotation of the rotor corresponds approximately with the axis of the semicircle and may be canted relative to the forward direction of aircraft movement to provide a component of forward thrust. The wings are supported in a tandem, horizontally spaced relation so that a rotor located along the trailing edge of one of the wings increases the downward flow of air relative thereto and also increases the downward flow of air relative to the other wing, whereby each rotor associated with each wing augments or magnifies the downward flow of air produced by each other rotor so as to further produce additional lift for the aircraft. In addition, lighter-than-air bouyancy units may be connected to the opposite ends of each of the wings so as to further provide a lifting force on the aircraft.

26 Claims, 13 Drawing Figures

PATENTED DEC 24 1974

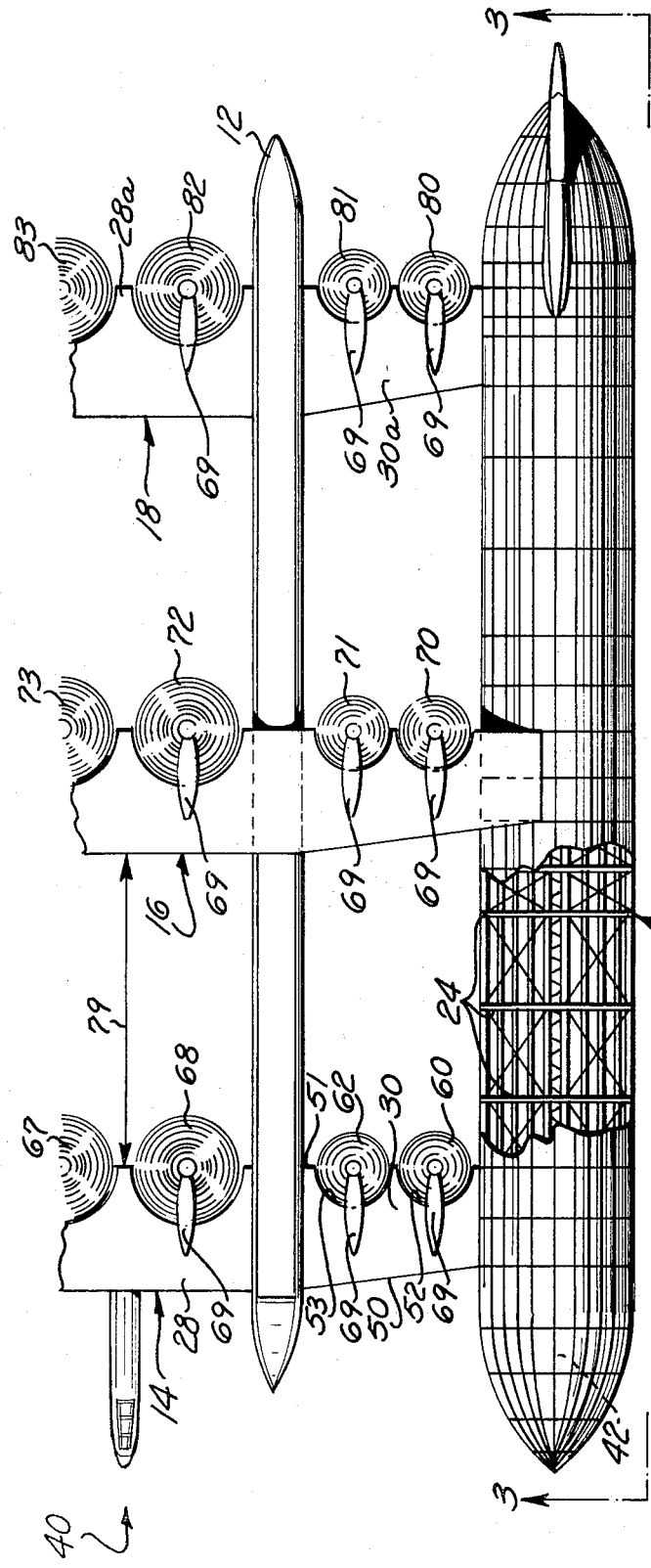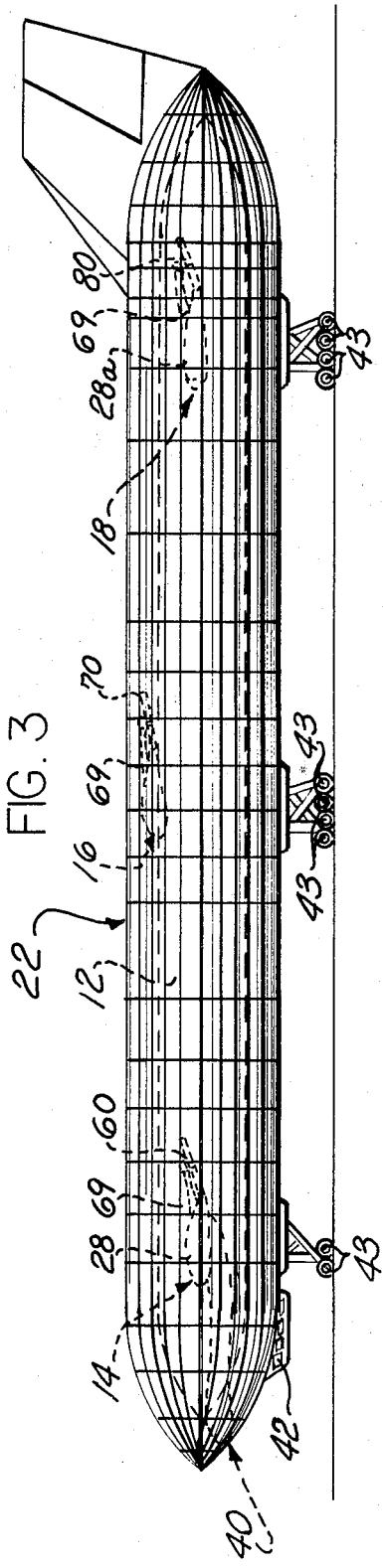
FIG. 2
FIG. 3

AIRCRAFT TRANSPORTER

The present invention relates to an aircraft, and particularly relates to an aircraft capable of carrying extremely high payloads.

A significant break-through in a lift system for an aircraft is disclosed in U.S. Pat. No. 3,372,891 issued to Frank S. Malvestuto, Jr. In essence, U.S. Pat. No. 3,372,891 discloses a wing structure in which the wing has an airfoil portion which is constructed so as to provide a lift when the wing is moved through air. Associated with the airfoil portion is a rotor which rotates in a semicircular configuration defined by the trailing edge of the wing. The rotor has a plurality of rotor blades, the tips of which rotate in a plane. The plane of rotation of the tips intersects the trailing edge of the wing and the tips are located within the profile of the trailing edge. The advantage of the concept disclosed in the patent is that the use of the rotor substantially improves the lifting capabilities of the wing structure over that of a combined airfoil and rotor which is not associated with the airfoil in the unique manner disclosed in the patent. In essence, the rotating rotor increases the flow of air over the upper surface of the airfoil and reduces the flow of air across the lower surface of the airfoil. As a result, the action of the airfoil is rendered more effective. In addition, as the tips of the blades of the rotor rotate, vortexes are inherently created at the tips of the blade and this vortex action is such that an additional lifting force is applied to the undersurface of the airfoil as a result thereof. Accordingly, as a result, a wing structure of substantially improved lift capabilities is provided in which the thrust of the rotor, as well as the airfoil, are added together and, due to the cooperative aerodynamic relationship of the rotor and the airfoil, the airfoil is rendered substantially more effective.

In addition, a radially outward force component can be created by the rotor which force component acts on the semicircular trailing edge surface to provide a forward thrust component on the aircraft.

The present invention is directed to an aircraft which applies the concept disclosed in the Malvestuto U.S. Pat. No. 3,372,891 to an airplane transporter which is capable of carrying substantial quantities or weights of payload. In fact, the present invention is capable, depending on size of components, etc., of carrying in the range of 6,000,000 pounds of payload. Due to the substantial payload which the aircraft of the present invention is capable of carrying, the aircraft can be adapted to the carrying of liquified natural gas or crude oil from areas of difficult terrain and hostile environment, such as the Arctic Islands of Canada and the north slope portion of Alaska. In fact, a fleet of such aircraft is an efficient, practical alternative to a pipeline for transporting such materials from those areas.

As noted, the aircraft which embodies the present invention applies the concepts disclosed in U.S. Pat. No. 3,372,891 along with lighter-than-air buoyancy units in order to render the unit capable of carrying the extremely heavy high payload noted above. The buoyancy units are connected to opposite ends of the wing structure and minimize air flow around the ends of the wing and function as end plates. Therefore, this improves the efficiency of the rotary structure and adds to the lifting capacity.

In addition, the present invention provides a multiple-winged structure where the wings are located in tandem and where rotor blades are associated with the trailing edge of each of the wings. The wings are spaced appropriately so that the downward airflow created by one wing-rotor system provides a positive assist or augmentation to the downward airflow created by the next tandem-located wing-rotor system. As a result, the total lift on the tandem wing-rotor system is equal to the lift on the front wing-rotor induction system, plus the lift on the rear wing-rotor induction system, plus the increment of lift on the front wing-rotor system induced by the rear wing-rotor system, plus the increment of lift on the rear wing-rotor system induced by the front wing-rotor system. The result is that the combined action of two tandem-arranged wing-rotor lift systems is substantially greater than two times the lift action of a single wing-rotor induction lift system as disclosed in the aforementioned patent.

In addition, in accordance with the present invention, it has been discovered that by arranging the rotor blades so that they are canted with respect to the direction of forward movement of the aircraft, forward thrust of substantial effect is applied thereby to the aircraft and can be utilized to supplement the forward thrust applied by the rotor blades to the trailing edge of the wing.

Further features of the present invention will be apparent to those skilled in the art to which it relates from the following detailed description of a preferred embodiment made with reference to the accompanying drawings in which:

FIG. 2 is a plan view of a portion of the aircraft shown in FIG. 1;

FIG. 3 is a side elevational view of the aircraft shown in FIG. 1;

The present invention provides a substantially improved aircraft. The aircraft of the present invention is particularly designed for purposes of carrying liquified natural gas or crude oil from locations which are difficult to reach, the possibly otherwise unaccessible as a practical matter even by pipeline.

Figure 1:
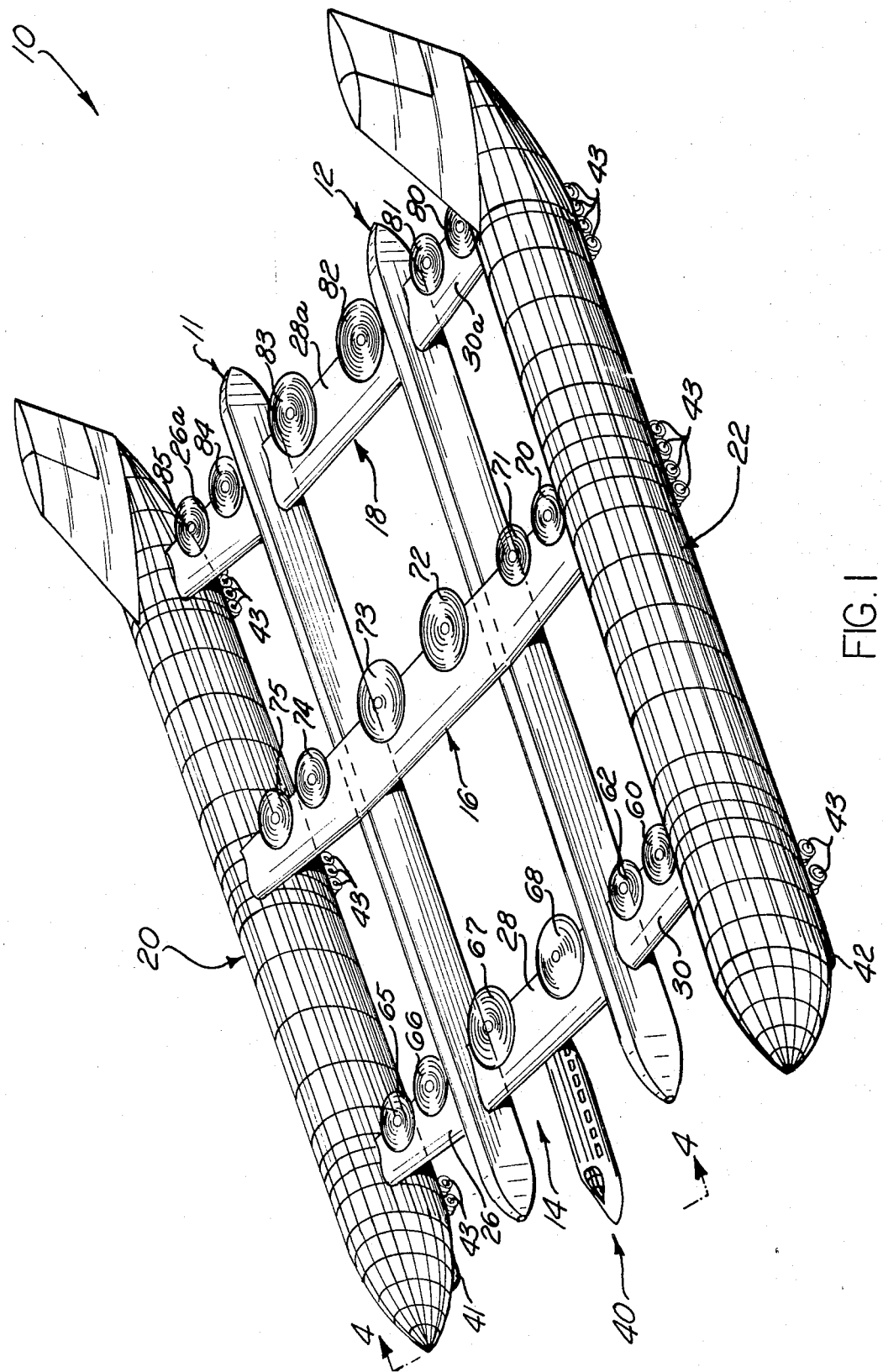
FIG. 1 is a perspective, somewhat pictorial representation, of an aircraft embodying the present invention.
Figure 4:
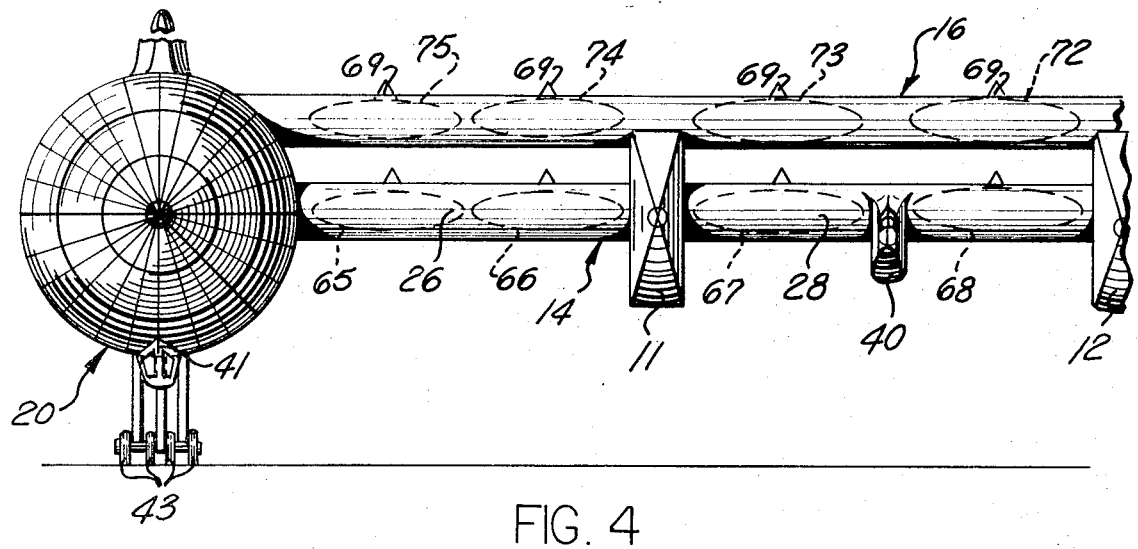
FIG. 4 is a front elevational view of a portion of the aircraft shown in FIG. 1.

The aircraft which embodies the present invention is disclosed schematically and pictorially in FIG. 1 and is generally designated 10. The aircraft 10 includes a pair of spaced structural units 11, 12 which may also be payload carriers. The vehicle 10 also includes a plurality of wings 14, 16 and 18. The outer opposite ends of the wings 14, 16, and 18 are connected with lighter-than-air buoyancy units. The payload may also be carried in the wing end plate units 20 and 22 and in the wings 14, 16, 18, as well as the structural units 11, 12.

The structural units and payload carriers 11 and 12 may be of any conventional construction and are illustrated as generally streamline-shaped elongated storage tanks which define chambers for receiving any type of payload such as liquified natural gas, crude oil, or the like. Appropriate bulkheads stress skin nd latticework are arranged in the payload carriers 11 and 12 for purposes of carrying the load, and any suitable construction thereof may be provided.

The aircraft 10 is suitably provided with a flight deck, generally designated 40. Observation cars 41 and 42 may be provided on the forward ends of the buoyancy units 20 and 22. In addition, suitable landing gear, generally designated 43, are provided for landing and take-off of the aircraft. Furthermore, the vehicle is provided with a tail rudder section on each of the buoyancy units 20 and 22 for purposes of stabilizing of the aircraft. The aircraft may be capable of substantially vertical take-off and landings and could be designed for take-off or landing on water, snow, etc.

The wing-end plate buoyancy unit 20 and 22 are of a lighter-than-air construction. The unit 22, as shown in FIG. 2, is constructed of a plurality of compartments 24. Each of the compartments is adapted to receive helium. Preferably, the helium is contained in bags which are positioned in the compartments 24. Once the helium bags are positioned in the buoyancy units, the buoyancy units, of course, being lighter than air, apply a substantial lifting force to the vehicle. In a vehicle designed for purposes of carrying 6,000,000 pounds of payload, the buoyancy effect provided by the buoyancy units 20, 22 may be in the order of 2,000,000 pounds of lift. The lift provided by the buoyancy units 20, 22 may be in excess of the weight of the aircraft and in such cases suitable means such as ballast or ties must be used to prevent the aircraft, when not loaded, from raising.

The wing structure 14 includes a plurality of wing portions designated 26, 28 and 30. The wing portion 26 is connected with the buoyancy unit 20 and the payload carrier 11. The wing portion 28 is connected with the payload carriers 11 and 12. The section 30 is of the wing 14 extends between and is connected with the payload carrier 12 and the buoyancy unit 22. However, these wing sections 26, 28 and 30 may be portions of a single continuous wing construction passing through the payload carriers 11, 12. The wing 18 is of a similar construction and has three sections 26a, 28a and 30a which are connected with the same parts as noted above with respect to the wing 14.

The wing structures 14 and 18 are connected to the payload carriers and the buoyancy units substantially centrally thereof that is, the wing structures 14 and 18 are located substantially centrally with respect to the vertical extremeties of the vehicle. The buoyancy units 20, 22 have a substantial diameter (in the order of 140 ft.) and are connected centrally to the outer tips of the wing sections 26, 26a and 30, 30a. The buoyancy units 20, 22 have portions which are located above the wing tips and portions projecting below the wing tips. These portions "end plate" the wing tips, and specifically minimize the flow of air over the wing tips between the lower and upper surfaces thereof. In effect, the buoyancy units direct the air flow over the wing sections and tend to maximize the lifting effectiveness of the wing structures 14, 18.

The wing structure 16 comprises a single structural unit which extends between the upper portions of the buoyancy units 20 and 22, and extends over the upper portion of the payload carriers 11 and 12. The wing structure 16, of course, is suitably connected with the upper portions of the payload carriers 11 and 12, as well as to the buoyancy units 20 and 22. The buoyancy units 20, 22 "end plate" the wing structure 16 by preventing air flow from the underside of the wing to the top side of the wing around the wing tip and thereby maximizing the lifting effectiveness of the wing structure 16.

It should be apparent from the above that the lifting forces which are applied to the wing structures 14, 16 and 18 are transmitted thereby to the payload carriers 11, 12 and to the end-plate buoyancy units 20, 22, and suitable structural design of both the wing and the connections to the buoyancy units 20, 22 and payload carriers 11, 12 is necessary for the weights to be handled.

In order to add substantially to the lift capability of the aircraft, each of the wing structures 14, 16 and 18 is provided with an induction air lift system. As shown in the embodiment disclosed, the wing structure 14, and particularly the section 30 thereof, has a leading edge 50 and a trailing edge 51 (see FIG. 2). The trailing edge is configured so as to define two semicircular recesses 52 and 53 therein. The section 30 is of an airfoil shape and defined by an upper surface 55 and a lower surface 56, (see FIG. 6). The construction of the section 30 of the wing 14 is such that as the aircraft 10 moves through the air, the flow of air across the upper surface 55 and the lower surface 56 is such as to create a lifting force on the wing, as is conventional. The lifting force, of course, results due to the fact that the air which moves across the upper surface of the wing moves at a much higher speed, causing a reduction in pressure along the upper surface of the wing, and the air moving across the lower surface moves slower, causing an increase in pressure on the undersurface of the wing. This is the well-known aerodynamic airfoil effect which causes a lifting force to be applied to the wing of the aircraft.

In the disclosed aircraft 10, the above-mentioned lifting force is augmented or assisted by rotary means 60, 62, each having a plurality of blades which are associated with the semicircular recesses 52 and 53 in the trailing edge portion of the wing section 30. The rotary blades are located so that the tips thereof are in close proximity to the trailing edge portion defining the surface of the semicircle but are spaced therefrom. The rotary blades have tips which rotate about a generally vertical axis, which as shown in FIG. 1, generally corresponds with the axis of the semicircular recess portion with which the blades are associated. The tips of the blades 60, 62 rotate in a plane which extends perpendicular to the surface defining the semicircular trailing edge surface and intersects the semicircular trailing edge surface of the wing.

Figure 6:
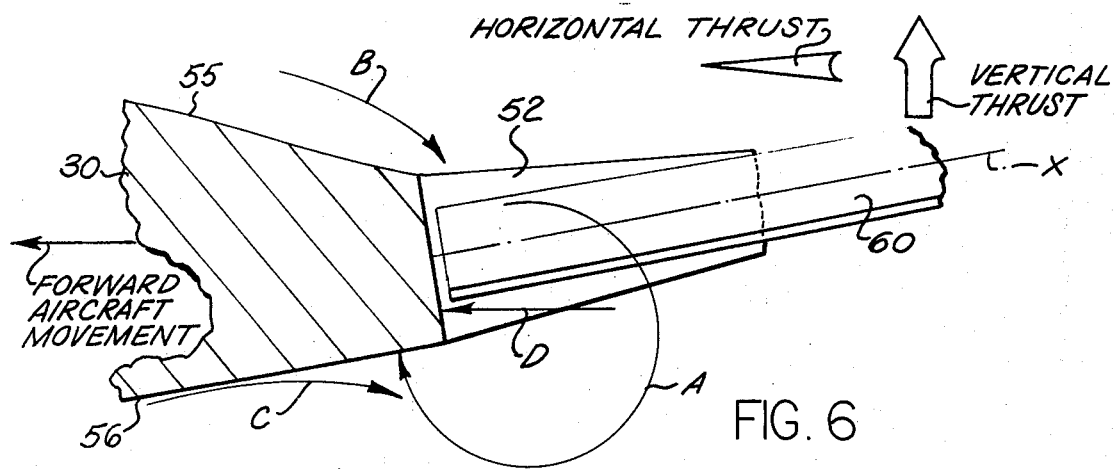
FIG. 6 is a somewhat schematic view illustrating the angled relationship of the rotor to provide substantial forward thrust.

As the rotary blades 60 and 62 rotate, they increase the velocity at which the air moves across the upper surface 55 of the wing section 30 by drawing the air rapidly thereover as indicated by flow arrow B, and at the same time they tend to compact the air or to increase the pressure beneath the wing section 30 and, additionally, to slow the flow of air across the undersurface of the wing as indicated by flow arrow C, (see FIG. 6). As a result, the rotary blades 60, 62 affect or aid in a positive manner the lifting action of the airfoil wing section 30 with which they are associated.

Figure 7:
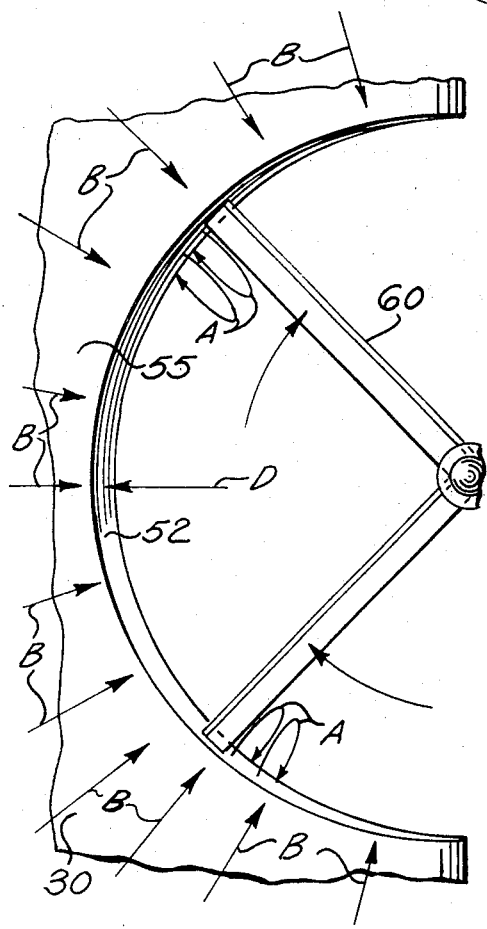
FIG. 7 is a schematic top plan view of a portion of a rotor and wing structure.
Figure 8:
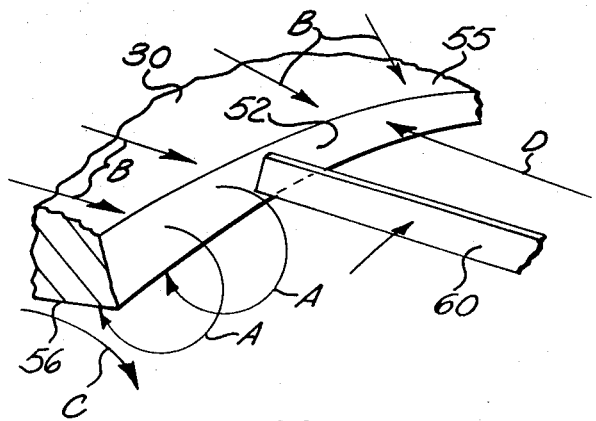
FIG. 8 is a schematic pictorial representation of the relationship of a rotor-wing structure.

In addition, as the rotary blades rotate, a vortex action is created at the rotary blade tips which interact with the semi-circular trailing edge, as shown in FIG. 8. This vortex action creates a flow of air which further applies a lifting force on the undersurface of the wing. This vortex action inherently occurs trailing each blade of the rotor and is represented schematically in the drawings by the flow arrows designated A in FIGS. 6, 7 and 8.

In addition to the vortex action and improvement in the airfoil action, the rotating blades provide a vertical thrust much in the manner of a helicopter blade which causes an additional lifting force to be applied to the wing section 26.

The rotary blades 60, 62 are driven by a suitable power source to which energy or fuel is delivered in any suitable manner. In addition, the blades 60, 62 are supported by the wing section 30 and suitably connected therewith by a strut-supporting section 69 which is capable of transmitting the vertical thrust of the blades 60, 62 to the wing structure.

It should be apparent from the drawings that the section 26 of the wing 14, as well as the section 28 of the wing 14, also has two rotary units associated therewith, and which are designated 65–68 and all of which are constructed and associated with their wing section in the manner described above in connection with the rotary units 60 and 62.

Not only does the wing structure 14 have six rotary units associated with it, but also the wing structure 16 has six rotary units associated with it and which are designated 70–75. The wing structure 18 also has six rotary units, which are designated 80–85, associated with it. The rotary units are all arranged on the various wings in the same spaced relationship so that a line through the center of each rotary unit coincides with the trailing edge of the portion of the wing between the rotary units.

From the above, it should be apparent that the rotary units which are associated with the various wing sections tremendously enhance the lifting capability of the aircraft 10 over and above the lifting capability of the airfoil wing sections alone. Of course, the number and size of the rotary blades and the size of the power source for rotating the blades associated with the wing sections can be increased to even further increase the lifting capability of the aircraft 10. While six rotary units are shown in the drawings as being associated with each wing structure, any number of rotary units can be associated with the wing structure to meet the desired payload requirements.

As noted, the rotary units which are associated with the wing structures provide a tremendous lift on the aircraft 10; the rotary units also function to propel the aircraft forwardly. This forward propelling effect is provided by the rotary blades creating an increase in pressure in the area beneath the rotary blades, and radially outward from the tips of the blades. This increase in pressure caused by the blade tip action provides a forward thrust represented by arrow D in the drawings on the trailing edge portion of the wing structure and is capable of propelling the aircraft forwardly.

In order to increase the forward propelling effect of the rotary blades in accordance with the present invention and as best shown in FIG. 6, the rotary blades are canted in a forward direction. In addition to the forward thrust provided by the pressure represented by arrow D acting on the trailing edge surface portion, the rotary blades provide a forward thrust component due to the foward canting thereof. In the preferred embodiment, the axis of rotation of the blades is moved off the vertical by about 10° so that the plane of rotation of the blades (designated X in FIG. 6) intersects the forward direction of movement of the aircraft during cruise flight at an angle of about 10°. The semicircular trailing edge portion is, as shown in FIG. 6, parallel to the axis of rotation of the blades and likewise forms a 10° angle with the vertical.

Figure 5:
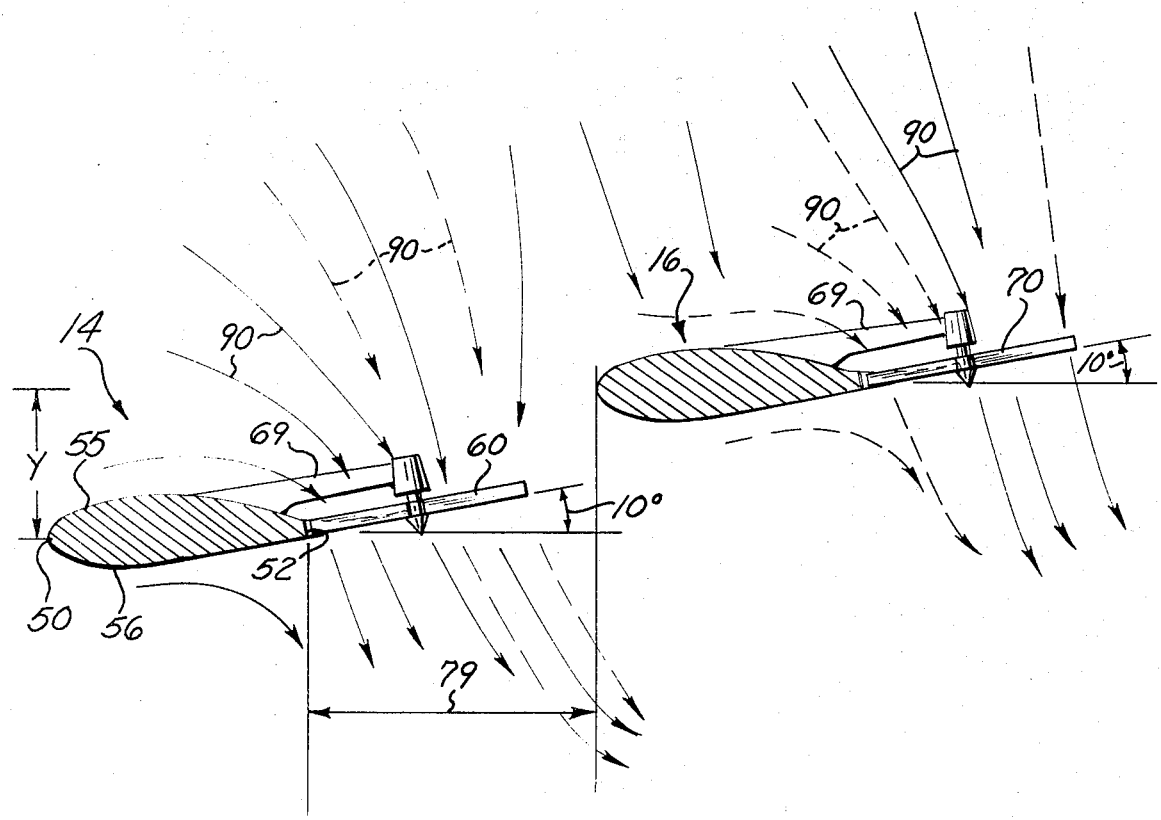
FIG. 5 is a schematic view illustrating the tandem relationship of the wings of the vehicle and the effect that the rotors on the tandem wings have on each other.

While the individual cooperative action of the rotary units with the airfoil with which it is associated is described in detail above, the advantageous effect of the rotary units in a tandem wing arrangement is important. FIG. 5 schematically illustrates this effect. Referring to FIG. 6, the tandem wings 14, 16 are shown in section and only one rotor is shown associated with each wing, it being understood that other rotors, of course, are associated with the wings.

As the aircraft 10 moves through the air, the rotors act on a large mass of air both above and below the aircraft as the aircraft passes therethrough, and it might be stated that these masses of air move slowly down and rearwardly of the aircraft, as is generally designated by the flow arrows 90 in FIG. 5. Each of the rotors on each of the wings produces an induces movements of large masses of air. When the wings are located in tandem and in the presence of each other, each wing produces a downward and rearward movement of a portion of the fluid or gas mass in the neighborhood of the other wing. As illustrated schematically in FIG. 7, by the full line arrows, the rotor 60 associated with the wing 14 induces or produces a downward and rearward movement of a portion of the fluid or gas mass in the neighborhood of the wing 16 and in the reverse, the rotor 70 produces a downwardly flow or movement of gas in the neighborhood of the wing 14 as indicated by the dotted line arrows. The effect of each rotor on its neighbor wing, of course, is not as great as its effect on its own wing.

Accordingly, each wing therefore has a downward and rearward flow of fluid around it that is produced by itself and the rotors associated with it and by the action of the rotors associated with the adjacent wing. Accordingly, the total lift which is applied to the aircraft is the lift of the wing 14, plus the lift of the wing 16, plus the increment of lift on the wing 14 induced by the wing 16 and the increment of lift on the wing 16 induced by the wing 14. Accordingly, providing the tandem wings provides a substantially improved lift system.

The spacing of the wings 14 and 16 is important so that one wing will produce the desired effect on the adjacent wing. The spacing between the tandem wings 14 and 16 should not be greater than about 70 percent of the total wing span of each wing. In other words, the distance designated 79 in FIGS. 2 and 5 can be up to 70 percent of the inside distance between the buoyancy units 20, 22.

The minimum distance or spacing between tandem wing structures must take into consideration the aerodynamic effect of the front or leading wing on the trailing wing. In the event the wings are located in the same plane closely together, the leading wing will have a detrimental effect on the trailing wing. Specifically, the angle of attack or angle that the air in general contacts the trailing wing will not be proper, and even in the preferred embodiment, the wing 16 is vertically spaced to minimize the angle of attack effect.

In addition, the rotor units on the leading wing will affect the air flow on the trailing wing. The semicircular recesses 52, 53 in the trailing edge of the lead wing project about one-half of the distance through the wing chord. Accordingly, the rotor blades project about one-half of a wing chord in distance from the trailing edge of the leading wing. Accordingly the trailing wing physically, if in the same plane as the leading wing, would have to be located at least sufficiently so that there is no interference with the rotor blades on the forward wing. The spacing between the wings 16 and 18 should be likewise in order to take advantage of the tandem effect.

Figure 9:
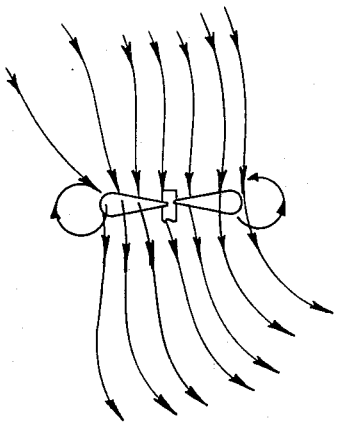
FIGS. 9, 10, 11 and 12 are schematic pictorial representations of air flow around various aerodynamic structures.

The interaction of the rotor and the wing, together with the interaction between tandemly located wings, may be evaluated in terms of the approximate resulting airflow streamlines, as illustrated in FIGS. 9, 10, 11 and 12. In FIG. 9 the approximate airflow configuration is shown for a rotor alone moving forward through an air mass in the manner similar to what is observed in a helicopter.

Figure 10:
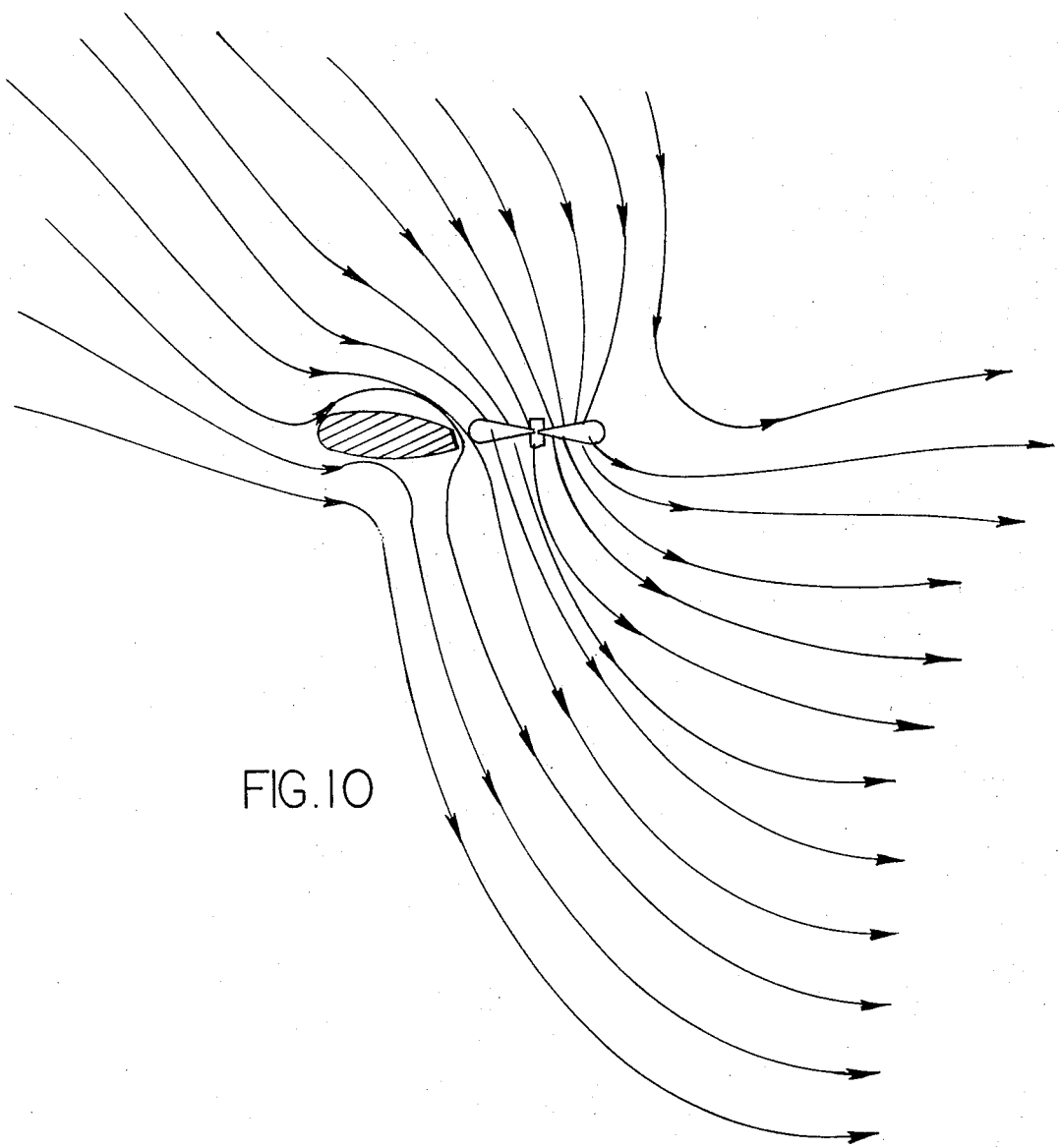

FIG. 10 shows approximate airflow configuration for such a rotor operating in combination with a wing structure. Note that a larger mass of air is caused to move downward and across the combination of wing and rotor than is shown in the FIG. 9 for the rotor operating independently of the wing. In effect, the wing in combination with the rotor gives an airflow pattern which would be comparable to that which would be observed if the rotor blades were theoretically elongated during the forward portion of their rotation to sweep an area which includes the combined wing-rotor area. In other words, the rotor-wing combination acts on the air in the same manner as if it were a very much larger rotor with an area equal to that of the existing rotor plus the portion of the wing forward of the rotor. This results in distributing the horsepower over a large area to give the efficiency of a very low disc loading in terms of a small fraction of a horsepower per square foot of effective combined wing-rotor area. It is well known that the power loading of a helicopter in terms of gross weight lifted per horsepower used will increase substantially when the rotor area is increased to provide a low disc loading measured in horsepower per square foot of rotor area. However, due to the strength of material limitations, there is a practical limit as to the size of the rotor area available on any helicoper system. Generally speaking, a practical helicopter system will utilize disc loadings ranging from about ½ HP/sq. ft. to about 3 HP/sq. ft. With the combined wing-rotor system as utilized in this invention and the Malvestuto U.S. Pat. No. 3,372,891, it is now practical to distribute the horsepower applied to the rotor over a much larger effective area, consisting of the rotor area plus wing area, as illustrated in FIG. 10. On this basis, it is possible to achieve effective disc loadings in the range from one-tenth HP/sq. ft. to 1 HP/sq. ft. and thereby achieve correspondingly higher power loadings ranging from 160 lbs./HP to 100 lbs/HP.

Figure 11:
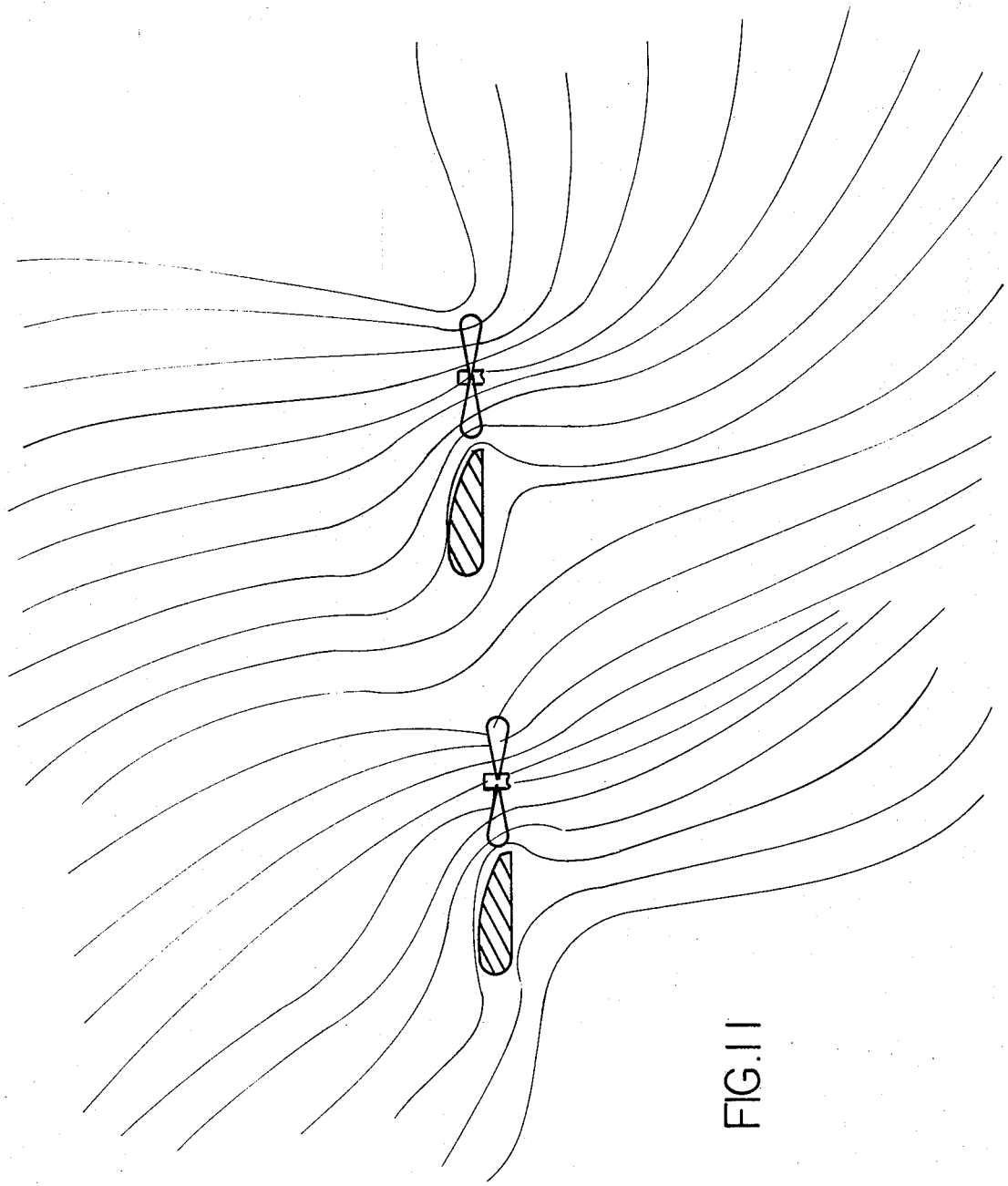

FIG. 11 shows the approximate airflow configuration resulting from two tandemly located induction wing-rotor systems.

Figure 12:
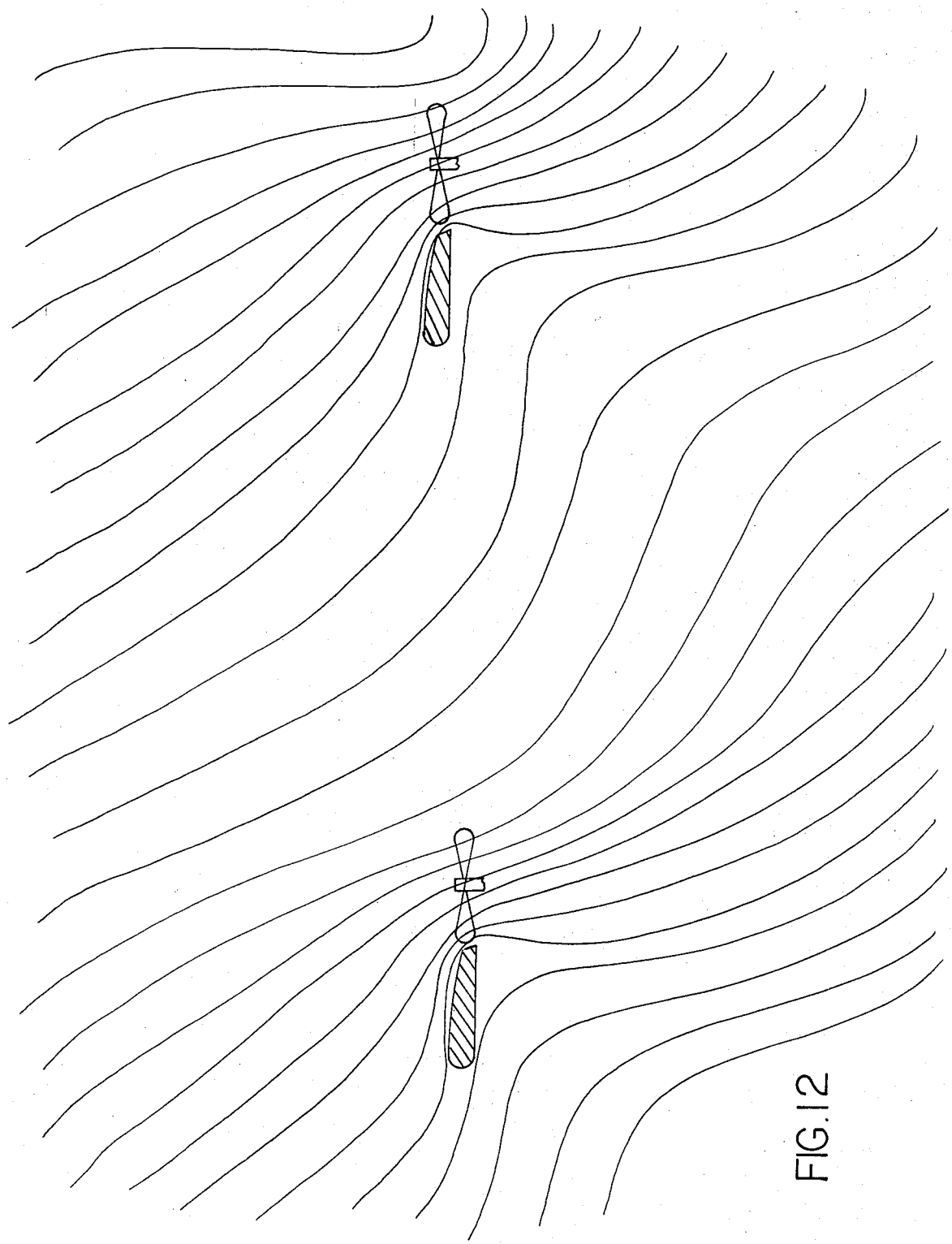

FIG. 12 shows the approximate effective airflow configuration for a wider spaced tandem arrangement of induction wing-rotor systems. Note that in FIG. 12 a larger mass of air is given an effective downwash velocity than in FIG. 11. If the tandemly located induction-rotor systems were moved much farther apart, then each would act independently and not create a downwash velocity for the air between such tandem assemblages. Consequently, it is important that the tandem induction wing-rotor assemblages are spaced close enough together so that the intervening airflow between assemblages is effectively propelled downward by the interaction of the forward and rear wing-rotor assemblies in the manner shown in FIG. 12. Also, it is important that these induction wing-rotor systems are spaced far enough apart so that a maximum volume of air is given an effective downwash velocity as shown in FIG. 12, rather than the more limited volume of air as shown in FIG. 11.

For any particular combination of horsepower used and wing-rotor geometries, an optimum spacing between the tandem assemblies should be determined by direct experimental measurements or aerodynamic calculations. The effect of entraining a large volume of air to be given an effective downwash velocity between the volumes of air that would normally be acted upon by each induction wing-rotor assembly acting separately effectively distributes the horsepower applied to the rotors over the total area encompassing each wing-rotor system and the area between such tandemly located wing-rotor assemblages. Consequently, the effective disc loading measured in HP/sq. ft. of area may be made very small, ranging from 0.001 HP/sq. ft. up to about 0.1 HP/sq. ft., by making the effective disc area encompass all of the area between the tandem wing-rotor assemblies, as well as the area of the wing-rotor assemblies themselves. If the effective disc loading is made very small by means of this invention, then the effective power loading can be increased to values ranging from 300 lbs./HP to 160 lbs./HP for such tandem induction wing-rotor assemblages.

Figure 13:
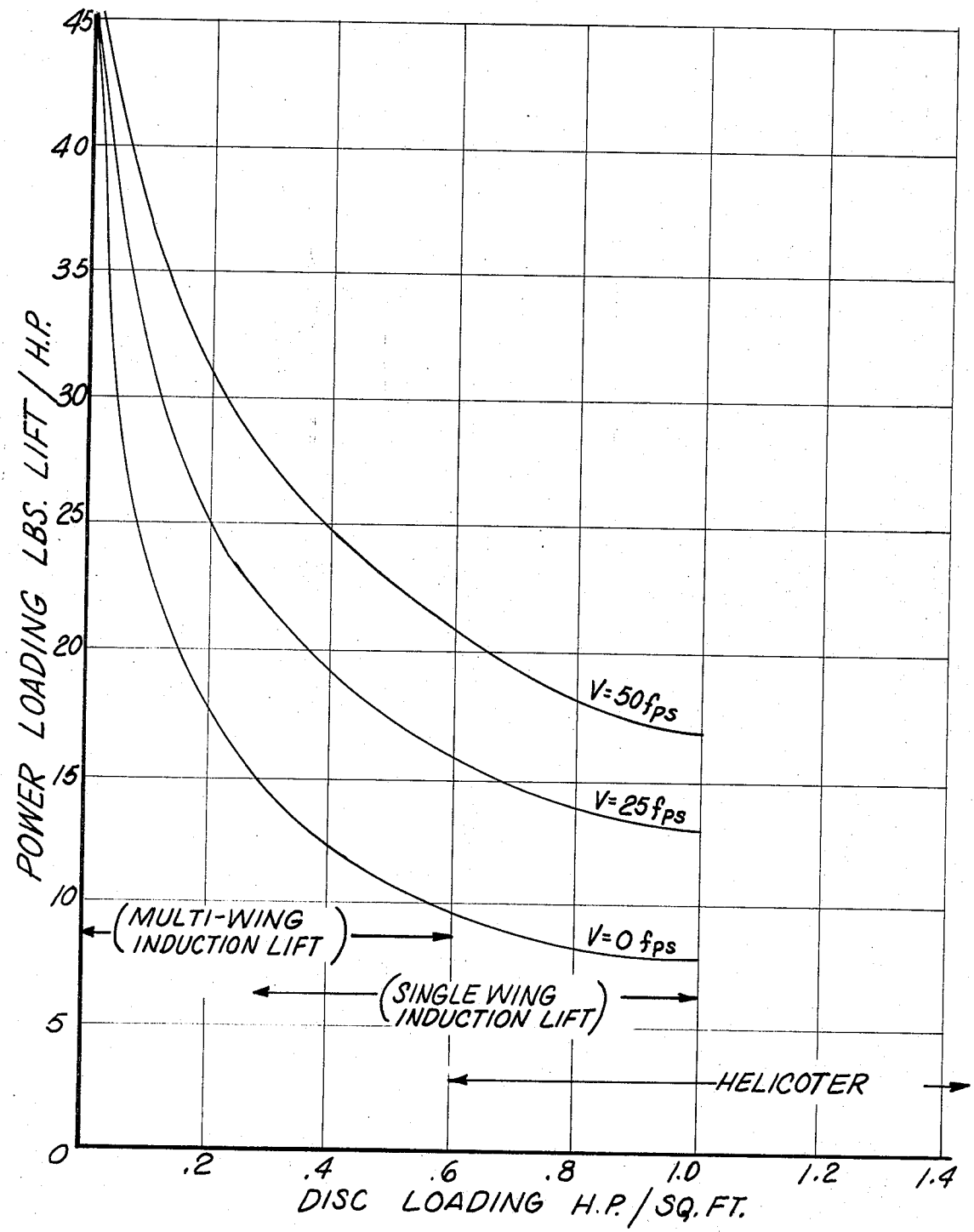
FIG. 13 is a graph illustrating the lift capabilities of various aerodynamic structures.

FIG. 13 shows the approximate relationship between effective power loading in lbs. lifted/HP on a vertical scale, plotted against effective disc loading in lbs./sq. ft. plotted on a horizontal scale. As observed in this graph, the helicopter has very low efficiencies in terms of effective lift/HP utilized, which range from 0.6 lbs./HP to 1.4 lbs./HP. The single-wing induction lift system is mechanically able to achieve a distribution of HP over a larger effective area ranging from one-tenth HP/sq. ft. to 1 HP/sq. ft., thereby giving effective power loadings ranging from 160 lbs./HP to 100 lbs./HP. The tandem induction wing-rotor assemblages can achieve a further distribution of horsepower over a greater effective area so as to reduce the disc loading the values ranging from 0.001 HP/sq. ft. to 0.1 HP/sq. ft., thereby achieving effective power loadings ranging from 300 lbs/HP to 160 lbs./HP.

What is claimed is:

1. An aircraft comprising a wing structure, said wing structure comprising at least one wing having a leading edge and a trailing edge, said one wing having upper and lower surfaces defining an airfoil portion for producing a lifting force when said wing is moved forwardly through the air, at least a portion of the trailing edge of said airfoil portion being configured to define an arcuate recess having a forward portion and a pair of rearwardly extending side portions, a power-driven rotor connected with said one wing and mounted for rotation about a forwardly canted axis which extends at an acute angle to a horizontal plane and is disposed in a vertical plane extending parallel to the direction of forward movement of said one wing, said rotor having generally radial blades with tip portions which are movable along an annular path which slopes upwardly and rearwardly from said trailing edge of said one wing and is at least partially disposed within said arcuate recess, said annular path having a leading portion which is disposed closely adjacent to said forward portion of said recess, said leading portion of said annular path being disposed above said lower surface of said airfoil portion and below said upper surface of said airfoil portion, said annular path having a pair of spaced apart side portions which are disposed closely adjacent to said rearwardly extending side portions of said recess, each of said side portions of said annular path being disposed above said lower surface of said airfoil portion and below said upper surface of said airfoil portion, said annular path having an arcuate trailing portion which is disposed diametrically opposite and above said leading portion of said annular path, said annular path having a first diametral axis extending forwardly and downwardly at an acute angle to a horizontal plane and intersecting said leading and trailing portions of said annular path, said first diametral axis being disposed in a vertical plane extending parallel to the path of movement of the aircraft, said annular path having a second diametral axis which extends perpendicular to said first diametral axis and parallel to the horizontal plane, said blades having surface means for producing upward and forward thrust and for inducing a low pressure air flow across said upper surface and a high pressure air flow under said lower surface to thereby urge said aircraft upwardly and forwardly upon rotation of said blades, and means for rotating said blades.

2. An aircraft as set forth in claim 1 further comprising an elongated body, a pair of elongated and spaced apart lighter-than-air lifting buoyancy units having longitudinal axes extending parallel to a longitudinal axis of said body, said one wing being connected with and extending between said buoyancy units and said body, said airfoil portion of said one wing disposed between said buoyancy units, a second wing connected with and extending between said buoyancy units and said body at a location rearwardly of said one wing, said second wing including leading and trailing edges and upper and lower surfaces defining a second airfoil portion which is disposed between said buoyancy units, at least a portion of the trailing edge of said second airfoil portion being configured to define a second arcuate recess, a second power-driven rotor connected with said second wing and mounted for rotation about a forwardly canted axis which extends at an acute angle to the horizontal plane and is disposed in a vertical plane extending parallel to the direction of forward movement of said second wing, said second rotor having generally radial blades with tip portions which are movable along a second annular path which slopes upwardly and rearwardly from said trailing edge of said second wing and is at least partially disposed within said second arcuate recess, said second annular path having a leading portion which is disposed closely adjacent to a forward portion of said second recess, said leading portion of said second annular path being disposed above said lower surface of said second airfoil portion and below said upper surface of said second airfoil portion, said second annular path having a pair of spaced apart side portions which are disposed closely adjacent to rearwardly extending side portions of said second recess, each of said side portions of said second annular path being disposed above said lower surface of said second airfoil portion and below said upper surface of said second airfoil portion, said second annular path having an arcuate trailing portion which is disposed diametrically opposite and above said leading portion of said second annular path, said second annular path having a first diametral axis extending forwardly and downwardly at an acute angle to the horizontal plane and intersecting said leading and trailing portions of said second annular path, said first diametral axis of said second annular path being disposed in a vertical plane extending parallel to the path of movement of the aircraft, said second annular path having a second diametral axis which extends perpendicular to said first diametral axis and parallel to the horizontal plane, said blades of said second rotor having surface means for producing upward and forward thrust and for inducing a low pressure air flow across said upper surface of said second airfoil portion and a high pressure air flow under said lower surface of said second airfoil portion to further urge said aircraft upwardly and forwardly upon rotation of said blades of said second rotor, and means rotating said blades of said second rotor.

3. An aircraft as set forth in claim 1 further comprising an elongated body connected with said first wing structure, a second wing structure connected with and extending transversely outwardly of opposite sides of said body at a location above a horizontal plane extending through the connection between said body and said first wing structure so that said second wing structure is vertically offset relative to said first wing structure, said second wing structure including leading and trailing edges and upper and lower surfaces defining a second airfoil portion which is effective to apply a component of lift to said second wing structure, at least a portion of the trailing edge of said second airfoil portion being configured to define a second arcuate recess having a forward portion and a pair of rearwardly extending side portions, a second power driven rotor connected with said second wing strucutre for inducing a low pressure flow of air across said upper surfaces of said second airfoil portion and a high pressure flow of air across said lower surface of said second airfoil portion to further urge said aircraft upwardly, said second rotor including a plurality of generally radial blades with tip portions which are movable along a second annular path which extends rearwardly from said trailing edge of said second airfoil portion and is at least partially disposed within said second arcuate recess, said second annular path having a leading portion which is disposed closely adjacent to said forward portion of said second recess, said leading portion of said second annular path being disposed above said lower surface of said second airfoil portion, said second annular path having a pair of spaced-apart side portions which are disposed closely adjacent to said rearwardly extending side portions of said second recess, each of said side portions of said second annular path being disposed above said lower surface of said second airfoil portion and below said upper surface of said second airfoil portion, said second annular path having an arcuate trailing portion which is disposed rearwardly of said trailing edge of said second airfoil portion.

4. An aircraft as set forth in claim 1 said wing structure further includes upper and lower surface portions defining a second airfoil portion for producing a lifting force when said wing structure is moved forwardly through the air, at least a portion of the trailing edge of said second airfoil portion being configured to define a second arcuate recess having a forward portion and a pair of rearwardly extending side portions, a second power-driven rotor connected with said wing structure and mounted for rotation about a forwardly canted axis which extends at an acute angle to a horizontal plane and is disposed in a vertical plane extending parallel to the direction of forward movement of said wing structure, said second rotor having generally radial blades with tip portions which are movable along a second annular path which slopes upwardly and rearwardly from said trailing edge of said wing structure and is at least partially disposed within said second arcuate recess, said second annular path having a leading portion which is disposed closely adjacent to said forward portion of said second recess, said leading portion of said second annular path being disposed above said lower surface of said second airfoil portion and below said upper surface of said second airfoil portion, said second annular path having a pair of spaced apart side portions which are disposed closely adjacent to said rearwardly extending side portions of said second recess, each of said side portions of said second annular path being disposed above said lower surface of said second airfoil portion and below said upper surface of said second airfoil portion, said second annular path having an arcuate trailing portion which is disposed diametrically opposite and above said leading portion of said second annular path, said second annular path having a first diametral axis extending forwardly and downwardly at an acute angle to a horizontal plane and intersecting said leading and trailing portions of said second annular path, said first diametral axis of said second annular path being disposed in a vertical plane extending parallel to the path of movement of the aircraft, said second annular path having a second diametral axis which extends perpendicular to said first diametral axis and parallel to the horizontal plane, said blades of said second rotor having surface means for producing upward and forward thrust and for inducing a low pressure air flow across said upper surface of said second airfoil portion and a high pressure air flow under said lower surface of said second airfoil portion to thereby further urge said aircraft upwardly and forwardly upon rotation of said blades of said second rotor, and means for rotating said blades of said second rotor.

5. An aircraft as set forth in claim 4 wherein said aircraft further includes a pair of spaced apart and longitudinally extending bodies, said wing structure being connected with said bodies, said first and second airfoil portions and said first and second rotors being disposed intermediate said bodies.

6. An aircraft as set forth in claim 4 wherein said aircraft further includes a longitudinally extending transport body, said wing structure being connected with and extending outwardly from opposite sides of said transport body, said first airfoil portion and said first rotor being disposed on one side of said transport body and said second airfoil portion and said second rotor being disposed on a side of said transport body opposite from said one side.

7. An aircraft comprising an elongated body, a first wing structure connected with and extending transversely outwardly of opposite sides of said body, said first wing structure including leading and trailing edges and upper and lower surfaces defining a first airfoil portion which is effective to apply a component of lift to said first wing structure, at least a portion of the trailing edge of said first airfoil portion being configured to define a first arcuate recess having a forward portion and a pair of rearwardly extending side portions, a second wing structure connected with and extending transversely outwardly of opposite sides of said body, said second wing structure including leading and trailing edges and upper and lower surfaces defining a second airfoil portion which is effective to apply a component of lift to said second wing structure, at least a portion of the trailing edge of said second airfoil portion being configured to define a second arcuate recess having a forward portion and a pair of rearwardly extending side portions, first rotor means connected with said first wing structure for inducing a low pressure flow of air across said upper surface of said first airfoil portion and a high pressure flow of air across said lower surface of said first airfoil portion to urge said aircraft upwardly and for promoting a flow of air about said second airfoil portion, said first rotor means including a plurality of generally radial blades with tip portions which are movable along a first annular path which extends rearwardly from said trailing edge of said first airfoil portion and is at least partially disposed within said first arcuate recess, said first annular path having a leading portion which is disposed closely adjacent to said forward portion of said first recess, said leading portion of said first annular path being disposed above said lower surface of said first airfoil portion and below said upper surface of said first airfoil portion, said first annular path having a pair of spaced apart side portions which are disposed closely adjacent to said rearwardly extending side portions of said first recess, each of said side portions of said first annular path being disposed above said lower surface of said first airfoil portion and below said upper surface of said first airfoil portion, said first annular path having an arcuate trailing portion which is disposed rearwardly of said trailing edge of said first airfoil portion, second rotor means connected with said second wing structure for including a low pressure flow of air across said upper surfaces of said second airfoil portion and a high pressure flow of air across said lower surface of said second airfoil portion to further urge said aircraft upwardly, said second rotor means including a plurality of generally radial blades with tip portions which are movable along a second annular path which extends rearwardly from said trailing edge of said second airfoil portion and is at least partially disposed within said second arcuate recess, said second annular path having a leading portion which is disposed closely adjacent to said forward portion of said second recess, said leading portion of said second annular path being disposed above said lower surface of said second airfoil portion, said second annular path having a pair of spaced-apart side portions which are disposed closely adjacent to said rearwardly extending side portions of said second recess, each of said side portions of said second annular path being disposed above said lower surface of said second airfoil portion and below said upper surface of said second airfoil portion, said second annular path having an arcuate trailing portion which is disposed rearwardly of said trailing edge of said second airfoil portion.

8. An aircraft as set forth in claim 7 wherein said first rotor means is mounted for rotation about a forwardly canted axis which extends at an acute angle to a horizontal plane and is disposed in a vertical plane extending parallel to the path of movement of said aircraft and said trailing portion of said first annular path is disposed above said leading portion of said first annular path, said second rotor means being mounted for rotation about a forwardly canted axis which extends at an acute angle to a horizontal plane and is disposed in a vertical plane extending parallel to the path of movement of said aircraft and said trailing portion of said second annular path is disposed above said leading portion of said second annular path.

9. An aircraft as set forth in claim 8 wherein said first and second wing structures are vertically offset relative to each other.

10. An aircraft as set forth in claim 7 further including an elongated lighter-than-air lifting buoyancy unit extending between and connected to said first and second wing structures.

11. An aircraft as set forth in claim 10 wherein said first and second rotor means are mounted for rotation about forwardly canted axes which extend at acute angles to a horizontal plane.

12. An aircraft comprising a wing structure, said wing structure comprising at least one wing having a leading edge and a trailing edge, said one wing having upper and lower surfaces defining an airfoil portion for producing a lifting force when said wing is moved forwardly through the air, at least a portion of the trailing edge of said airfoil portion being configured to define an arcuate recess having a forward portion and a pair of rearwardly extending side portions, a power-driven rotor connected with said one wing and mounted for rotation about a forwardly canted axis which extends at an acute angle to a horizontal plane and is disposed in a vertical plane extending parallel to the direction of forward movement of said one wing, said rotor having generally radial blades with tip portions which are movable along an annular path which slopes upwardly and rearwardly from said trailing edge of said one wing and is at least partially disposed within said arcuate recess, said annular path having a leading portion which is disposed closely adjacent to said forward portion of said recess, said leading portion of said annular path being disposed above said lower surface of said airfoil portion and below said upper surface of said airfoil portion, said annular path having a pair of spaced apart side portions which are disposed closely adjacent to said rearwardly extending side portions of said recess, each of said side portions of said annular path being disposed above said lower surface of said airfoil portion and below said upper surface of said airfoil portion, said annular path having an arcuate trailing portion which is disposed diametrically opposite and above said leading portion of said annular path, said annular path having a first diametral axis extending forwardly and downwardly at an acute angle to a horizontal plane and intersecting said leading and trailing portions of said annular path, said first diametral axis being disposed in a vertical plane extending parallel to the path of movement of the aircraft, said annular path having a second diametral axis which extends perpendicular to said first diametral axis and parallel to the horizontal plane, said blades having surface means for producing upward and forward thrust and for inducing a low pressure air flow across said upper surface and a high pressure air flow under said lower surface to thereby urge said aircraft upwardly and forwardly upon rotation of said blades, and means for rotating said blades, said wing structure further including upper and lower surface portions defining a second airfoil portion for producing a lifting force when said wing structure is moved forwardly through the air, at least a portion of the trailing edge of said second airfoil portion being configured to define a second arcuate recess having a forward portion and a pair of rearwardly extending side portions, a second power-driven rotor connected with said wing structure and mounted for rotation about a forwardly canted axis which extends at an acute angle to a horizontal plane and is disposed in a vertical plane extending parallel to the direction of forward movement of said wing structure, said second rotor having generally radial blades with tip portions which are movable along a second annular path which slopes upwardly and rearwardly from said trailing edge of said wing structure and is at least partially disposed within said second arcuate recess, said second annular path having a leading portion which is disposed closely adjacent to said forward portion of said second recess, said leading portion of said second annular path being disposed above said lower surface of said second airfoil portion and below said upper surface of said second airfoil portion, said second annular path having a pair of spaced apart side portions which are disposed closely adjacent to said rearwardly extending side portions of said second recess, each of said side portions of said second annular path being disposed above said lower surface of said second airfoil portion and below said upper surface of said second airfoil portion, said second annular path having an arcuate trailing portion which is disposed diametrically opposite and above said leading portion of said second annular path, said second annular path having a first diametral axis extending forwardly and downwardly at an acute angle to a horizontal plane and intersecting said leading and trailing portions of said second annular path, said first diametral axis of said second annular path being disposed in a vertical plane extending parallel to the path of movement of the aircraft, said second annular path having a second diametral axis which extends perpendicular to said first diametral axis and parallel to the horizontal plane, said blades of said second rotor having surface means for producing upward and forward thrust and for inducing a low pressure air flow across said upper surface of said second airfoil portion and a high pressure air flow under said lower surface of said second airfoil portion to thereby further urge said aircraft upwardly and forwardly upon rotation of said blades of said second rotor, means for rotating said blades of said second rotor, and first arm means extending rearwardly from the upper surface of said first airfoil portion for supporting said first rotor and second arm means extending rearwardly from the upper surface of said second airfoil portion for supporting said second rotor.

13. An aircraft comprising an elongated transport body, a pair of elongated and spaced apart lighter-than-air lifting buoyancy units disposed on opposite sides of said transport body, said buoyancy units having longitudinal axes extending parallel to a longitudinal axis of said transport body, a first wing structure connected with and extending between said buoyancy units and said transport body, said first wing structure including leading and trailing edges and upper and lower surfaces defining a first airfoil portion which is disposed between said buoyancy units, at least a portion of the trailing edge of said first airfoil portion being configured to define a first arcuate recess, a second wing structure connected with and extending between said buoyancy units and said transport body at a location rearwardly of said first wing structure, said second wing structure including leading and trailing edges and upper and lower surfaces defining a second airfoil portion which is disposed between said buoyancy units, at least a portion of the trailing edge of said second airfoil portion being configured to define a second arcuate recess, first rotor means connected with said first wing structure for inducing a low pressure flow of air across said upper surface of said first airfoil portion and a high pressure flow of air across said lower surface of said first airfoil portion to urge said aircraft upwardly, said first rotor means including a plurality of generally radial blades with tip portions which are movable along a first annular path which extends rearwardly from said trailing edge of said first airfoil portion and is at least partially disposed within said first arcuate recess, said first annular path having a leading portion which is disposed closely adjacent to an arcuate forward portion of said first recess, said first annular path having an arcuate trailing portion which is disposed rearwardly of said trailing edge of said first airfoil portion and is disposed forwardly of said leading edge of said second airfoil portion, second rotor means connected with said second wing structure for inducing a low pressure flow of air across said upper surface of said second airfoil portion and a high pressure flow of air across said lower surface of said second airfoil portion to further urge said aircraft upwardly, said second rotor means including a plurality of generally radial blades with tip portions which are movable along a second annular path which extends rearwardly from said trailing edge of said second airfoil portion and is at least partially disposed within said second arcuate recess, said second annular path having an arcuate trailing portion which is disposed rearwardly of said trailing edge of said second airfoil portion, and a second elongated transport body having a longitudinal axis extending parallel to the longitudinal axes of said buoyancy units, said second elongated transport body being connected with said first and second wing structures at locations between said buoyancy units.

14. An aircraft comprising an elongated transport body, a pair of elongated and spaced apart lighter-than-air lifting buoyancy units disposed on opposite sides of said transport body, said buoyancy units having longitudinal axes extending parallel to a longitudinal axis of said transport body, a first wing structure connected with and extending between said buoyancy units and said transport body, said first wing structure including leading and trailing edges and upper and lower surfaces defining a first airfoil portion which is disposed between said buoyancy units, at least a portion of the trailing edge of said first airfoil portion being configured to define a first arcuate recess, a second wing structure connected with and extending between said buoyancy units and said transport body at a location rearwardly of said first wing structure, said second wing structure including leading and trailing edges and upper and lower surfaces defining a second airfoil portion which is disposed between said buoyancy units, at least a portion of the trailing edge of said second airfoil portion being configured to define a second arcuate recess, first rotor means connected with said first wing structure for inducing a low pressure flow of air across said upper surface of said first airfoil portion and a high pressure flow of air across said lower surface of said first airfoil portion to urge said aircraft upwardly, said first rotor means including a plurality of generally radial blades with tip portions which are movable along a first annular path which extends rearwardly from said trailing edge of said first airfoil portion and is at least partially disposed within said first arcuate recess, said first annular path having a leading portion which is disposed closely adjacent to an arcuate forward portion of said first recess, said first annular path having an arcuate trailing portion which is disposed rearwardly of said trailing edge of said first airfoil portion and is disposed forwardly of said leading edge of said second airfoil portion, second rotor means connected with said second wing structure for inducing a low pressure flow of air across said upper surface of said second airfoil portion and a high pressure flow of air across said lower surface of said second airfoil portion to further urge said aircraft upwardly, said second rotor means including a plurality of generally radial blades with tip portions which are movable along a second annular path which extends rearwardly from said trailing edge of said second airfoil portion and is at least partially disposed within said second arcuate recess, said second annular path having a leading portion which is disposed closely adjacent to an arcuate forward portion of said second recess, said second annular path having an arcuate trailing portion which is disposed rearwardly of said trailing edge of said second airfoil portion, and first arm means extending rearwardly from the upper surface of said first airfoil portion for supporting said first rotor means and second arm means extending rearwardly from the upper surface of said second airfoil portion for supporting said second rotor means.

15. An aircraft comprising an elongated body, a first wing structure connected with and extending transversely outwardly of opposite sides of said body, said first wing structure including leading and trailing edges and upper and lower surfaces defining a first airfoil portion which is effective to apply a component of lift to said first wing structure, at least a portion of the trailing edge of said first airfoil portion being configured to define a first arcuate recess having a forward portion and a pair of rearwardly extending side portions, a second wing structure connected with and extending transversely outwardly of opposite sides of said body, said second wing structure including leading and trailing edges and upper and lower surfaces defining a second airfoil portion which is effective to apply a component of lift to said second wing structure, at least a portion of the trailing edge of said second airfoil portion being configured to define a second arcuate recess having a forward portion and a pair of rearwardly extending side portions, first rotor means connected with said first wing structure for inducing a low pressure flow of air across said upper surface of said first airfoil portion and a high pressure flow of air across said lower surface of said first airfoil portion to urge said aircraft upwardly and for promoting a flow of air about said second airfoil portion, said first rotor means including a plurality of generally radial blades with tip portions which are movable along a first annular path which extends rearwardly from said trailing edge of said first airfoil portion and is at least partially disposed within said first arcuate recess, said first annular path having a leading portion which is disposed closely adjacent to said forward portion of said first recess, said leading portion of said first annular path being disposed above said lower surface of said first airfoil portion and below said upper surface of said first airfoil portion, said first annular path having a pair of spaced apart side portions which are disposed closely adjacent to said rearwardly extending side portions of said first recess, each of said side portions of said first annular path being disposed above said lower surface of said first airfoil portion and below said upper surface of said first airfoil portion, said first annular path having an arcuate trailing portion which is disposed rearwardly of said trailing edge of said first airfoil portion, second rotor means connected with said second wing structure for inducing a low pressure flow of air across said upper surfaces of said second airfoil portion and a high pressure flow of air across said lower surface of said second airfoil portion to further urge said aircraft upwardly, said second rotor means including a plurality of generally radial blades with tip portions which are movable along a second annular path which extends rearwardly from said trailing edge of said second airfoil portion and is at least partially disposed within said second arcuate recess, said second annular path having a leading portion which is disposed closely adjacent to said forward portion of said second recess, said leading portion of said second annular path being disposed above said lower surface of said second airfoil portion, said second annular path having a pair of spaced-apart side portions which are disposed closely adjacent to said rearwardly extending side portions of said second recess, each of said side portions of said second annular path being disposed above said lower surface of said second airfoil portion and below said upper surface of said second airfoil portion, said second annular path having an arcuate trailing portion which is disposed rearwardly of said trailing edge of said second airfoil portion, and first arm means extending rearwardly from the upper surface of said first airfoil portion for supporting said first rotor means and second arm means extending rearwardly from the upper surface of said second airfoil portion for supporting said second rotor means.

16. An apparatus as set forth in claim 12 wherein said power driven rotors are mounted for rotation about axes which are canted forwardly at an angle of approximately 10° to a horizontal plane.

17. An aircraft as defined in claim 12 further including at least a pair of spaced lighter-than-air lifting buoyancy bodies connected with opposite end portions of said wing structure, each of said buoyancy bodies having a portion which projects above the upper surface of said wing structure and a second portion which projects below said lower surface of said wing structure.

18. An aircraft as set forth in claim 13 wherein said leading portions of said first and second annular paths are disposed above said lower surfaces of said first and second airfoil portions and below said upper surfaces of said first and second airfoil portions.

19. An aircraft as set forth in claim 18 wherein said first and second annular paths each having a pair of spaced apart side portions which are disposed closely adjacent to rearwardly extending side portions of the associated one of said recesses, each of said side portions of said first and second annular paths being disposed above said lower surfaces of said first and second airfoil portions and below said upper surfaces of said first and second airfoil portions, said first and second annular paths each having an arcuate trailing portion which is disposed diametrically opposite and above said leading portion of the associated one of said annular paths.

20. An aircraft as set forth in claim 19 wherein said first and second annular paths each have a first diametral axis extending forwardly and downwardly at an acute angle to a horizontal plane and intersecting said leading and trailing portions of the associated one of said annular paths, said first diametral axes each being disposed in vertical planes extending parallel to the path of movement of the aircraft, said first and second annular paths each having a second diametral axis which extends perpendicular to the associated one of said first diametral axes and is parallel to the horizontal plane.

21. An aircraft as set forth in claim 13 wherein said buoyancy units each has an upper portion which projects above the upper surfaces of said first and second airfoil portions and a lower portion which projects below the lower surfaces of said first and second airfoil portions.

22. An aircraft as set forth in claim 14 wherein said leading portions of said first and second annular paths are disposed above said lower surfaces of said first and second airfoil portions and below said upper surfaces of said first and second airfoil portions, said first and second annular paths each have a pair of spaced apart side portions which are disposed closely adjacent to rearwardly extending side portions of the associated one of said recesses, each of said side portions of said first and second annular paths being disposed above said lower surfaces of said first and second airfoil portions and below said upper surfaces of said first and second airfoil portions, said first and second annular paths each having an arcuate trailing portion which is disposed diametrically opposite and above said leading portion of the associated one of said annular paths, said first and second annular paths each having a first diametral axis extending forwardly and downwardly at an acute angle of approximately 10° to a horizontal plane and intersecting said leading and trailing portions of the associated one of said annular paths, said first diametral axes each being disposed in vertical planes extending parallel to the path of movement of the aircraft, said first and second annular paths each having a second diametral axis which extends perpendicular to the associated one of said first diametral axes and is parallel to the horizontal plane.

23. An aircraft as set forth in claim 15 wherein said first rotor means is mounted for rotation about a forwardly canted axis which extends at an acute angle to a horizontal plane and is disposed in a vertical plane extending parallel to the path of movement of said aircraft and said trailing portion of said first annular path is disposed above said leading portion of said first annular path, said second rotor means being mounted for rotation about a forwardly canted axis which extends at an acute angle to a horizontal plane and is disposed in a vertical plane extending parallel to the path of movement of said aircraft and said trailing portion of said second annular path is disposed above said leading portion of said second annular path.

24. An aircraft as set forth in claim 23 wherein said first and second wing structures are vertically offset relative to each other.

25. An aircraft as set forth in claim 15 further including an elongated lighter-than-air lifting buoyancy unit extending between and connected to said first and second wing structures.

26. An aircraft as set forth in claim 25 wherein said first and second rotor means are mounted for rotation about forwardly canted axes which extend at acute angles to a horizontal plane.

* * * * *